US012570807B2

(12) United States Patent
Okitsu

(10) Patent No.: US 12,570,807 B2
(45) Date of Patent: Mar. 10, 2026

(54) POLYETHYLENE POWDER AND MOLDED ARTICLE

(71) Applicant: Asahi Kasei Kabushiki Kaisha, Tokyo (JP)

(72) Inventor: Naoya Okitsu, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/036,000

(22) PCT Filed: Nov. 12, 2021

(86) PCT No.: PCT/JP2021/041690
§ 371 (c)(1),
(2) Date: May 9, 2023

(87) PCT Pub. No.: WO2022/107690
PCT Pub. Date: May 27, 2022

(65) Prior Publication Data
US 2024/0026089 A1     Jan. 25, 2024

(30) Foreign Application Priority Data

Nov. 17, 2020    (JP) ................................ 2020-191016

(51) Int. Cl.
*C08J 3/12*        (2006.01)
*C08L 23/08*       (2025.01)
(Continued)

(52) U.S. Cl.
CPC ............. *C08J 3/12* (2013.01); *C08L 23/0815* (2013.01); *H01M 50/417* (2021.01);
(Continued)

(58) Field of Classification Search
None
See application file for complete search history.

(56) References Cited

U.S. PATENT DOCUMENTS 4,542,199 A     9/1985   Kaminsky et al.
5,684,097 A     11/1997  Palmroos et al.
(Continued)

FOREIGN PATENT DOCUMENTS

CN     109467630 A     3/2019
DE     3127133 A1     1/1983
(Continued)

OTHER PUBLICATIONS

English translation of Kikuchi et al. (JP 2017-145306) (Year: 2017).*
(Continued)

*Primary Examiner* — Ronak C Patel
(74) *Attorney, Agent, or Firm* — Morgan, Lewis & Bockius LLP

(57) ABSTRACT
A polyethylene powder having a viscosity average molecular weight of 100,000 or more and 2,500,000 or less, wherein, in a torque curve obtained when kneading the polyethylene powder under specific <Kneading Conditions> using a Labo Plastomill, a slope of a straight line connecting two local maximum points is 2 N·m/min or more and 15 Nm/min or less.

17 Claims, 1 Drawing Sheet

AVERAGE TORQUE [N·m]

RESIN TEMPERATURE [°C]

TIME [MIN]

(51) Int. Cl.
  *C08L 23/0807* (2025.01)
  *H01M 50/417* (2021.01)
(52) U.S. Cl.
  CPC ..... *C08J 2323/08* (2013.01); *C08L 2207/068* (2013.01); *C08L 2314/02* (2013.01)

(56) References Cited

U.S. PATENT DOCUMENTS

| | | | |
|---|---|---|---|
| 2008/0241510 A1 | 10/2008 | Van Marion et al. | |
| 2012/0028101 A1 | 2/2012 | Ishihara et al. | |
| 2012/0202044 A1 | 8/2012 | Brant et al. | |
| 2015/0065595 A1 | 3/2015 | Nasu et al. | |
| 2015/0299903 A1* | 10/2015 | Tanaka ..................... | D01F 6/04 |
| | | | 524/585 |
| 2016/0137760 A1 | 5/2016 | Kuwata | |
| 2018/0273708 A1* | 9/2018 | Kikuchi ................. | A61L 27/16 |
| 2018/0355076 A1 | 12/2018 | Garg et al. | |
| 2019/0002611 A1* | 1/2019 | Hamada ................... | B29B 9/08 |
| 2019/0177494 A1 | 6/2019 | Tsujimoto | |
| 2022/0162355 A1 | 5/2022 | Tanaka | |

FOREIGN PATENT DOCUMENTS

| | | | |
|---|---|---|---|
| EP | 4050043 A1 | 8/2022 | |
| JP | S56-032507 A | 4/1981 | |
| JP | H07-238109 A | 9/1995 | |
| JP | H10-510570 A | 10/1998 | |
| JP | 2004-217924 A | 8/2004 | |
| JP | 5722305 B2 | 5/2015 | |
| JP | 2015-101680 A | 6/2015 | |
| JP | 2015-134900 A | 7/2015 | |
| JP | 5782558 B1 | 9/2015 | |
| JP | 5840743 B2 | 1/2016 | |
| JP | 6135665 B2 | 5/2017 | |
| JP | 6281372 B2 | 2/2018 | |
| JP | 2019-019265 A | 2/2019 | |
| JP | 2019-099811 A | 6/2019 | |
| KR | 10-2017-0120091 A | 10/2017 | |
| WO | 2020/179650 A1 | 9/2020 | |
| WO | 2020/189443 A1 | 9/2020 | |

OTHER PUBLICATIONS

International Preliminary Report on Patentability and Written Opinion issued in International Patent Application No. PCT/JP2021/041690 dated Jun. 1, 2023.

Supplementary European Search Report issued in European Patent Application No. 21894564.0 dated Mar. 29, 2024.

International Search Report issued in corresponding International Patent Application No. PCT/JP2021/041690 dated Feb. 1, 2022.

Zhang et al., "Preparation and Development Trend of UHMWPE Separator for Lithium-ion Battery," Shanghai Plastics, 190 (2): 13-18 (2020) (see English translation only).

Zhao et al., "Preparation and Properties of UHMWPE Microporous Membrane for Lithium Ion Battery Diaphragm," Plastics Industry, 46 (9): 44-57 (2018) (see English translation only).

* cited by examiner

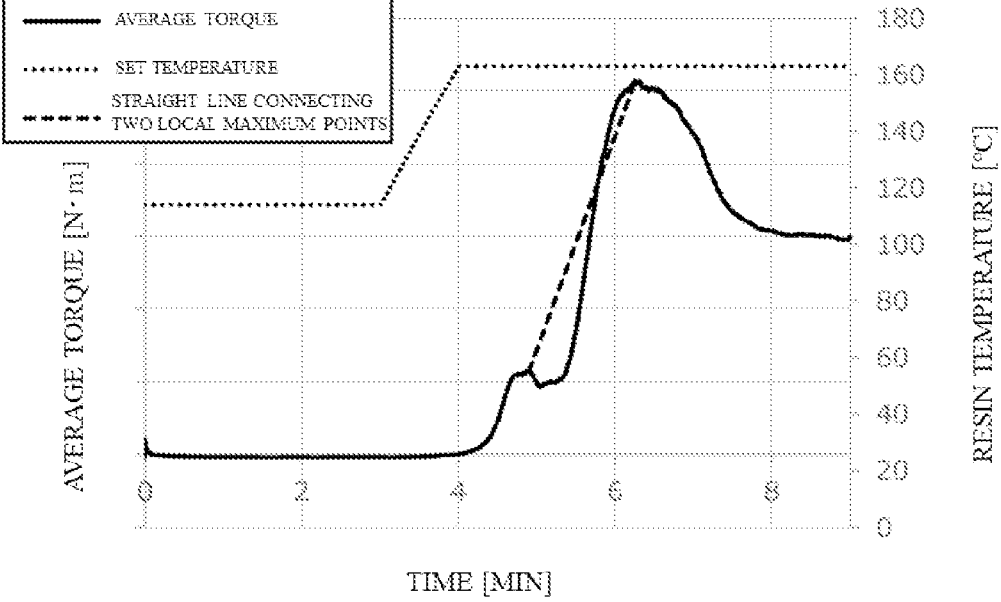

POLYETHYLENE POWDER AND MOLDED ARTICLE

TECHNICAL FIELD

The present invention relates to a polyethylene powder and a molded article.

BACKGROUND ART

Conventionally, ultra-high-molecular-weight polyethylene powders are molded by various molding methods, such as melt drawing, injection molding, extrusion molding, and compression molding, and used for various applications, such as films, sheets, microporous membranes, fibers, foams, and pipes. In recent years, demand as microporous membranes is increasing rapidly, and such microporous membranes are used for separators, which are important components of lithium-ion batteries and lead-acid batteries.

In addition to a function to allow only ions to pass through while separating the positive and negative electrodes, battery separators have a shutdown function to prevent the battery reaction from going out of control by blocking the passage of ions by melting the pores when a large current flows, in other words, a function to close the pores at a temperature lower than the temperature at which a thermal runaway occurs, a so-called fuse effect. There is a need to improve this shutdown function.

Battery separators are also required to have high mechanical strength.

Further, in the production of battery separators, a wet extrusion method is generally used to extrude polyethylene powders while dissolving them in solvents. In extrusion processing of polyethylene powders, if the dispersibility of the polyethylene powders in solvents is poor, unmelted materials are generated, leading to filter clogging in the extruder and worsening the appearance of the separators. Therefore, improvement of the dispersibility of polyethylene powders in solvents has been required for the improvement of the appearance.

In recent years, demand for higher capacity and higher output is rapidly increasing, mainly for automotive batteries. Along with this increasing demand, battery separators are required to have further improved long-term stability and shutdown function.

Here, the long-term stability of battery separators means that the microporous membrane has a uniform pore structure, so that there is no bias in ion transmission, and short circuit and degradation over time are less likely to occur.

As a polyethylene resin composition that can give a microporous film having excellent processability, air permeability, and mechanical strength, Patent Literature 1 discloses a polyethylene resin composition comprising an ethylene homopolymer having a specific melt flow rate, a specific molecular weight distribution, and a specific elution volume measured by cross-fractionation chromatography.

Patent Literature 2 discloses a battery separator comprising three polyethylenes with different physical properties, and having a low shutdown temperature and constant membrane strength and air permeability.

Patent Literature 3 discloses a battery separator having excellent long-term storage stability, high yield, and high output characteristics.

As a technique of obtaining a polyethylene powder that has excellent solubility and that can improve the productivity and product quality in processing molding, particularly wet extrusion molding, Patent Literature 4 discloses a technique of imparting predetermined particle size distribution and a predetermined swelling ratio at the same time.

Patent Literature 5 discloses a polyethylene resin composition produced by multistage polymerization and a molded article thereof, the polyethylene resin composition having excellent moldability, durability, and impact strength, wherein when the polyethylene resin composition is formed into a molded article, unevenness derived from high-molecular-weight gel is less likely to occur, and it is possible to produce a molded article with an excellent appearance.

CITATION LIST

Patent Literature

Patent Literature 1: Japanese Patent No. 5840743
Patent Literature 2: Japanese Patent No. 5722305
Patent Literature 3: Japanese Patent No. 6135665
Patent Literature 4: Japanese Patent Laid-Open No. 2019-19265
Patent Literature 5: Japanese Patent No. 6281372

SUMMARY OF INVENTION

Technical Problem

The polyethylene resin composition disclosed in Patent Literature 1 has excellent mechanical strength, air permeability, and processability, but a problem is that there is still room for improvement of shutdown function and long-term stability.

In Patent Literature 2, no consideration has been made to improve the dispersibility of the resin in the extrusion solvent, and a problem is that components with the highest molecular weight remain in the microporous membrane as unmelted materials, possibly causing deterioration in appearance. At locations where high-molecular-weight components are unevenly distributed in the microporous membrane, partial shrinkage is likely to occur due to the strong entanglement of molecular chains, and the pore structure of the microporous membrane becomes non-uniform, which causes problems of uneven ion transmission and poor long-term stability.

In Patent Literature 3, a problem is that no consideration has been made to improve the shutdown function of the battery separator.

In Patent Literatures 4 and 5, a problem is that no consideration has been made to improve the long-term stability and shutdown function of the battery separator.

Accordingly, in view of the problems of the prior art described above, an object of the present invention is to provide a polyethylene powder that can give a microporous membrane having an excellent appearance, high shutdown function, and a uniform pore structure, and thus serving as a battery separator with excellent long-term stability.

Solution to Problem

As a result of extensive research to achieve the above object, the present inventors have found that a polyethylene powder that can achieve the above object can be obtained by identifying the slope of a straight line connecting two local maximum points in a torque curve obtained when kneading the polyethylene powder under predetermined kneading conditions. Thus, the present invention has been completed.

Specifically, the present invention is as described below.

[1]

A polyethylene powder having a viscosity average molecular weight of 100,000 or more and 2,500,000 or less, wherein, in a torque curve obtained when kneading the polyethylene powder under the following <Kneading Conditions> using a Labo Plastomill a slope of a straight line connecting two local maximum points is 2 N·m/min or more and 15 N·m/min or less:

<Kneading Conditions>

After 24 g of liquid paraffin is kneaded for 10 minutes using a Labo Plastomill Mixer, produced by Toyo Seiki Seisaku-sho, Ltd. (unit model: 30C150, mixer model: R-60) at a set temperature of 114° C. and a rotation speed of 5 rpm, 16 g of the polyethylene powder and 0.4 g of an antioxidant are added thereto, followed by kneading at a rotation speed of 30 rpm for 3 minutes, and then the set temperature is raised from 114° C. to 163° C. over 1 minute; and after the temperature rise, the mixture is kneaded at a set temperature of 163° C. and a rotation speed of 30 rpm for 5 minutes.

[2]

The polyethylene powder according to [1], wherein, in the torque curve obtained when kneading the polyethylene powder using the Labo Plastomill under the above <Kneading Conditions>, a ratio of kneading energy (EA) during swelling to kneading energy (EB) during melting, (EA/EB), is 0.02 or more and 0.3 or less.

[3]

The polyethylene powder according to [1] or [2], wherein, in the torque curve obtained when kneading the polyethylene powder using the Labo Plastomill under the above <Kneading Conditions>, kneading energy ($E_0$) at the start of swelling is 5% or less of the total kneading energy ($E_t$).

[4]

The polyethylene powder according to any one of [1] to [3], wherein, in the torque curve obtained when kneading the polyethylene powder using the Labo Plastomill under the above <Kneading Conditions>, the ratio of kneading energy (EA) during swelling to kneading energy (EB) during melting, (EA/EB), is 0.02 or more and 0.1 or less.

[5]

The polyethylene powder according to any one of [1] to [4], which has a median diameter of 50 μm or more and 250 μm or less.

[6]

The polyethylene powder according to any one of [1] to [5], which is for use in a battery separator.

[7]

A molded article of the polyethylene powder according to any one of [1] to [5].

[8]

The molded article according to [7], which is a microporous membrane.

[9]

The molded article according to [7] or [8], which is a battery separator.

Advantageous Effect of Invention

The present invention can provide a polyethylene powder that can give a microporous membrane having an excellent appearance, high shutdown function, and a uniform pore structure, and thus serving as a battery separator with excellent long-term stability.

BRIEF DESCRIPTION OF DRAWING

FIG. 1 shows an example of the torque curve of the polyethylene powder.

DESCRIPTION OF EMBODIMENTS

An embodiment for carrying out the present invention (hereinafter also referred to as "the present embodiment") will be described in detail below.

The present embodiment below is an example for explaining the present invention, and is not intended to limit the present invention to the following contents.

The present invention can be modified in various ways within the scope of the gist thereof.

[Polyethylene Powder]

The polyethylene powder of the present embodiment has a viscosity average molecular weight of 100,000 or more and 2,500,000 or less, and in a torque curve obtained when kneading the polyethylene powder under the following <Kneading Conditions> using a Labo Plastomill, a slope of a straight line connecting two local maximum points is 2 N·m/min or more and 15 N·m/min or less:

<Kneading Conditions>

After 24 g of liquid paraffin is kneaded for 10 minutes using a Labo Plastomill Mixer, produced by Toyo Seiki Seisaku-sho, Ltd. (unit model: 30C150, mixer model: R-60) at a set temperature of 114° C. and a rotation speed of 5 rpm, 16 g of the polyethylene powder and 0.4 g of an antioxidant are added thereto, followed by kneading at a rotation speed of 30 rpm for 3 minutes, and then the set temperature is raised from 114° C. to 163° C. over 1 minute. After the temperature rise, the mixture is kneaded at a set temperature of 163° C. and a rotation speed of 30 rpm for 5 minutes.

Since the polyethylene powder of the present embodiment has the above configuration, a microporous membrane used as a battery separator having an excellent appearance, high shutdown function, and excellent long-term stability due to a uniform pore structure can be obtained.

The long-term stability of battery separators means that the microporous membrane has a uniform pore structure, so that there is no bias in ion transmission, and short circuit and degradation over time are less likely to occur.

The configuration of the polyethylene powder of the present embodiment will be described below.

The polyethylene powder of the present embodiment (hereinafter also referred to simply as "the powder") is composed of an ethylene-based polymer.

Examples of the ethylene-based polymer include an ethylene homopolymer, and a copolymer of ethylene and other comonomers copolymerizable with ethylene (e.g., a binary or ternary copolymer). The bonding form of the copolymer may be random or block.

Examples of other comonomers copolymerizable with ethylene include, but are not particularly limited to, α-olefins, vinyl compounds, and the like. Other comonomers can be used singly or in combination of two or more.

Examples of α-olefins include, but are not particularly limited to, $C_{3-20}$ α-olefins, and specific examples include propylene, 1-butene, 4-methyl-1-pentene, 1-hexene, 1-octene, 1-nonene, 1-decene, 1-undecene, 1-dodecene, 1-tridecene, and 1-tetradecene. Among these, other comonomers are preferably propylene and/or 1-butene, in terms of further enhancing the heat resistance and strength of the microporous membrane.

Examples of vinyl compounds include, but are not particularly limited to, vinyl cyclohexane, styrene, and derivatives thereof.

If necessary, non-conjugated polyenes, such as 1,5-hexadiene and 1,7-octadiene, may also be used as other comonomers.

(Viscosity Average Molecular Weight (Mv))

The polyethylene powder of the present embodiment has a viscosity average molecular weight (Mv) of 100,000 or more and 2,500,000 or less, preferably 200,000 or more and 2,000,000 or less, and more preferably 250,000 or more and 1,200,000 or less.

The viscosity average molecular weight (Mv) of the polyethylene powder can be controlled within the above numerical range by appropriately adjusting the polymerization conditions described later. Specifically, the viscosity average molecular weight (Mv) can be controlled, for example, by allowing hydrogen to be present as a chain transfer agent in the polymerization system or changing the polymerization temperature.

Because the viscosity average molecular weight (Mv) of the polyethylene powder is 100,000 or more, the microporous membrane containing the polyethylene powder of the present embodiment has sufficient mechanical strength. In contrast, because the viscosity average molecular weight (Mv) is 2,500,000 or less, the polyethylene powder of the present embodiment has excellent molding processability, such as dispersibility in solvents and stretchability. Therefore, microporous membranes molded by using the polyethylene powder of the present embodiment have few unmelted materials and thickness deviation, and an excellent appearance.

The viscosity average molecular weight (Mv) of the polyethylene powder of the present embodiment can be calculated by the following formula from the intrinsic viscosity [η] (dL/g) determined according to ISO1628-3 (2010). More specifically, the viscosity average molecular weight can be measured by the method described in the Examples.

$$Mv=(5.34\times10^4)\times[\eta]^{1.49}$$

(Slope of Straight Line Connecting Two Local Maximum Points in Torque Curve)

Examples of known indexes for estimating the impregnability of a plasticizer into the polyethylene powder include powder pore physical properties and solubility under static conditions.

However, since external mechanical force is applied to the polyethylene powder and plasticizer during molding, there is a possibility that the impregnability estimated from the above indexes and the actual impregnability may deviate.

One of the most important factors that determine the physical properties of microporous membranes molded by using the polyethylene powder is the entanglement state of molecular chains of polyethylene formed during extrusion. The entanglement state of molecular chains can be accurately evaluated by using the indexes under predetermined extrusion conditions.

Accordingly, in the present embodiment, in order to identify polyethylene powders suitable for microporous membranes, the slope of a straight line connecting two local maximum points in a torque curve obtained under predetermined kneading conditions is identified to thereby evaluate simultaneously and accurately the impregnability of the plasticizer into the polyethylene powder and the physical properties of the microporous membrane.

That is, it has been found that the slope of a straight line connecting two local maximum points in a torque curve obtained when kneading the polyethylene powder of the present embodiment using a Labo Plastomill Mixer, produced by Toyo Seiki Seisaku-sho, Ltd. (unit model: 30C150, mixer model: R-60) under the following <Kneading Conditions> is 2 N·m/min or more and 15 N·m/min or less, whereby a polyethylene powder that is very suitable as a raw material for microporous membranes can be obtained.

FIG. 1 shows an example of the torque curve.

In FIG. 1, the average torque (rotational load generated during kneading) (N·m) when kneading the powder under predetermined kneading conditions is plotted on the vertical axis, and the kneading time (min) is plotted on the horizontal axis. The solid line indicates the average torque, and the dashed line indicates the set temperature.

<Kneading Conditions>

After 24 g of liquid paraffin is kneaded for 10 minutes using a Labo Plastomill Mixer, produced by Toyo Seiki Seisaku-sho, Ltd. (unit model: 30C150, mixer model: R-60) at a set temperature of 114° C. and a rotation speed of 5 rpm, 16 g of the polyethylene powder and 0.4 g of an antioxidant are added thereto, followed by kneading at a rotation speed of 30 rpm for 3 minutes, and then the set temperature is raised from 114° C. to 163° C. over 1 minute. After the temperature rise, the mixture is kneaded at a set temperature of 163° C. and a rotation speed of 30 rpm for 5 minutes.

The range of the slope of a straight line connecting two local maximum points in the torque curve obtained when kneading the polyethylene powder of the present embodiment under the above <kneading Conditions> is 2 N·m/min or more and 15 N·m/min or less, preferably 3 N·m/min or more and 12 N·m/min or less, and more preferably 5 N·m/min or more and 10 N·m/min or less.

Because the slope of a straight line connecting two local maximum points in the torque curve obtained when kneading the polyethylene powder under the above <Kneading Conditions> is 2 N·m/min or more, it is possible to suppress the generation of unmelted materials, and it tends to be possible to produce a microporous membrane with an excellent appearance. Further, because the slope is 2 N·m/min or more, an uneven entanglement state of molecular chains in the polyethylene powder can be homogenized; thus, a microporous membrane molded by using the polyethylene powder of the present embodiment tends to have a uniform pore structure and excellent long-term stability.

In contrast, because the slope is 15 N·m/min or less, the fluidity of polyethylene is good during melting, and it tends to be possible to produce a microporous membrane in which pores are likely to be clogged during shutdown.

In general, a polyethylene powder has many pores, and when such a polyethylene powder is extruded in a plasticizer, the plasticizer impregnates through these pores. If the polyethylene powder has a pore structure that makes it difficult for the plasticizer to impregnate, before the plasticizer impregnates the center of the polyethylene powder, the temperature of the polyethylene powder reaches the melting point or higher and melting starts, thus clogging the pores. The center of the polyethylene powder that cannot come into contact with the plasticizer has poor dispersibility, and as a result, the powder tends to remain as unmelted materials. In particular, this tendency becomes even stronger when the molecular weight of the polyethylene powder is high.

In contrast, the polyethylene powder of the present embodiment has a fast impregnation speed of plasticizers and good dispersibility; thus, it is possible to suppress unmelted materials.

In general, the entanglement state of molecular chains formed when extruding the polyethylene powder in a plasticizer correlates with the entanglement state of molecular chains in the microporous membrane obtained by stretching after extrusion. Therefore, if the entanglement state of molecular chains formed during extrusion is not uniform, the microporous membrane will have areas with strong and weak entanglement of molecular chains. Areas with strong entanglement of molecular chains in the microporous membrane tend to shrink and the pores become smaller, while the pores in the surrounding areas are expanded. Since a larger amount of ions passes through areas with expanded pores, when the microporous membrane is used as a battery separator, degradation and short circuit tend to occur more easily during repeated charging and discharging. Further, if the entanglement of molecular chains is too strong, fluidity at the shutdown temperature tends to deteriorate.

In contrast, the polyethylene powder of the present embodiment is extruded to form a uniform and moderate entanglement state of molecular chains; thus, microporous membranes obtained after extrusion have a uniform pore structure, and their pores are easily clogged during shutdown.

In order for the slope of a straight line connecting two local maximum points in the torque curve obtained when kneading the polyethylene powder under the above <Kneading Conditions> to show a value within the above predetermined range, it is necessary that the polyethylene powder has a pore structure facilitating impregnation with a plasticizer, and that the entanglement state of molecular chains in the polyethylene powder can be easily homogenized in the kneading process. The characteristics of the polyethylene powder that satisfies these requirements are, for example, that the pores on the surface of the polyethylene powder are expanded, and that there is less entanglement of molecular chains on the surface of the polyethylene powder.

As the method for controlling the slope of a straight line connecting two local maximum points in the torque curve obtained when kneading the polyethylene powder under the above <Kneading Conditions> within the above numerical range, for example, the entanglement of molecular chains on the surface of the polyethylene powder is reduced, or the growth reaction of molecular chains is accelerated in the latter half of polymerization to expand the pores on the surface of the polyethylene powder. Specifically, for example, the following <Formula (I)> is satisfied in a multistage polymerization process, described later, comonomers are copolymerized in a flash tank located between reactors in the multistage polymerization process, and comonomers are introduced into a flash tank located after the reactor to post-polymerize a low-density ethylene copolymer.

$$\text{(Temperature of final-stage reactor)} - \text{(temperature of first-stage reactor)} \geq 20° \text{C.} \qquad \text{<Formula (I)>}$$

When the polyethylene powder is polymerized, since the active site of the polymerization reaction exists in the center of the polyethylene powder, it is presumed that polyethylene formed in the first half of the polymerization process exists on the surface side of the polyethylene powder, and that polyethylene formed in the latter half exists on the center side of the polyethylene powder. Therefore, by performing polymerization at a low temperature in the first half of the polymerization process, it is possible to generate molecular chains with less entanglement on the surface of the polyethylene powder. Accordingly, at the beginning of the kneading process, the molecular chains on the surface of the polyethylene powder tend to disperse quickly, and the entanglement of molecular chains in the center tends to disperse easily.

Due to the pressure from the molecular chains generated at the center of the polyethylene powder in the latter half of the polymerization process, the surface of the polyethylene powder is more likely to be stretched, loosening the entanglement and expanding the pores.

Further, by performing polymerization at a high temperature in the latter half of the polymerization process, the effect of loosening the entanglement of molecular chains on the surface of the polyethylene powder and the effect of expanding the pores are enhanced. In addition, these effects can be further enhanced by post-polymerizing a low-density ethylene copolymer after the polymerization process and making the polyethylene powder of the present embodiment a mixture of multiple polymers.

The measurement of the torque curve obtained under the above <Kneading Conditions> for identifying the physical properties of the polyethylene powder of the present embodiment is specifically performed in the following manner.

First, 24 g of liquid paraffin is placed in a Labo Plastomill Mixer, produced by Toyo Seiki Seisaku-sho, Ltd. (unit model: 30C150, mixer model: R-60) set at a temperature of 114° C., and kneaded at a rotation speed of 5 rpm for 10 minutes. 16 g of the polyethylene powder of the present embodiment and 0.4 g of an antioxidant are added to the liquid paraffin, and the mixture is kneaded at a rotation speed of 30 rpm for 3 minutes. After that, kneading is performed while raising the set temperature from 114° C. to 163° C. over 1 minute without changing the rotation speed. After raising the temperature, the mixture is kneaded for 5 minutes at a set temperature of 163° C. and a rotation speed of 30 rpm. Next, a torque curve is obtained by plotting the average torque (rotational load generated during kneading) [N·m] calculated by Labo Plastomill Mixer Test Program Ver. 4.52 (Copyright (C) Toyo Seiki Seisaku-sho, Ltd.) on the vertical axis, and the kneading time [min] on the horizontal axis. At this time, the average torque value is plotted every 0.125 seconds. Then, the elapsed times and torque values when the maximum value is shown are read.

In the above <Kneading Conditions>, the polyethylene powder and the antioxidant are preferably mixed in advance in a resin container.

The liquid paraffin used in the above <Kneading Conditions> may be any liquid paraffin that acts as a plasticizer, and that can form, when kneaded with the polyethylene powder, a homogeneous solution at a temperature equal to or higher than the melting point of the polyethylene powder.

Liquid paraffin refers to the purest hydrocarbon compound (oil) refined to a high degree of purity by removing impurities, such as aromatic hydrocarbons and sulfur compounds, contained in petroleum lubricating oil fractions with sulfuric anhydride and fuming sulfuric acid. Liquid paraffin is colorless, transparent, tasteless, and odorless, and examples include white oil, mineral oil, and the like.

The antioxidant used in the above <Kneading Conditions> is preferably a phenol-based antioxidant, which is a primary antioxidant. Examples include, but are not particularly limited to, 2,6-di-t-butyl-4-methylphenol, pentaerythrityl tetrakis-[3-(3,5-di-t-butyl-4-hydroxyphenyl)propionate], octadecyl 3-(3,5-di-t-butyl-4-hydroxyphenyl) propionate, and the like.

The torque curve obtained when kneading the polyethylene powder under the above <Kneading Conditions> has a first peak obtained such that the polyethylene powder is impregnated with a plasticizer and swollen, and a second peak obtained such that the polyethylene powder is dissolved and dispersed in the plasticizer.

Then, the time from the observation of a local maximum point A during the first peak to the observation of a local maximum point B during the second peak corresponds to the time required from impregnation of the polyethylene powder with the plasticizer to dispersion of the polyethylene powder in the plasticizer. The easier the plasticizer impregnates, the shorter this time. Further, the difference in rotational load generated during kneading, which is the value on the vertical axis between the first local maximum point A and the second local maximum point B, corresponds to the viscosity change of the system before and after dispersion of the polyethylene powder. The better the dispersibility of the polyethylene powder and the stronger the entanglement of molecular chains formed in the kneading process, the greater this change.

The slope of the straight line connecting the two local maximum points in the torque curve of the present embodiment can be more specifically measured by the method described in the Examples, described later.

(Ratio of Kneading Energy ($E_A$) During Swelling to Kneading Energy ($E_B$) During Melting ($E_A/E_B$) in Torque Curve)

In the torque curve obtained when kneading the polyethylene powder of the present embodiment under the above <Kneading Conditions>, the ratio of kneading energy ($E_A$) during swelling to kneading energy ($E_B$) during melting, ($E_A/E_B$), is preferably 0.02 or more and 0.3 or less, more preferably 0.02 or more and 0.2 or less, and even more preferably 0.02 or more and 0.1 or less.

The kneading energy ($E_A$) during swelling in the torque curve obtained when kneading the polyethylene powder of the present embodiment under the above <Kneading Conditions> is an integrated value of torque per unit volume from the point where the temperature rise starts until the local minimum point between the first and second peaks is reached. This value increases as a larger amount of plasticizer is incorporated into the polyethylene powder.

The kneading energy ($E_B$) during melting in the present embodiment is an integrated value of torque per unit volume from the local minimum point between the first and second peaks to the end of kneading. This value increases as the entanglement of molecular chains formed in the kneading process is stronger.

Because the ratio of kneading energy ($E_A$) during swelling to kneading energy ($E_B$) during melting, ($E_A/E_B$), is 0.02 or more, a moderate amount of plasticizer is incorporated into the polyethylene powder during swelling, and the generation of unmelted materials is further suppressed. Further, the fluidity of the polyethylene resin during melting tends to be improved. Therefore, it tends to be possible to produce a microporous membrane with a more excellent appearance and more enhanced shutdown function.

In contrast, because the ratio ($E_A/E_B$) is 0.3 or less, the required amount of plasticizer tends to be suppressed. Further, the entanglement of molecular chains formed in the kneading process tends to become uniform. Therefore, it is possible to reduce the production cost and environmental load in the production of microporous membranes, and it tends to be possible to produce a microporous membrane with a more uniform pore structure.

The ratio of kneading energy ($E_A$) during swelling to kneading energy ($E_B$) during melting, ($E_A/E_B$), in the torque curve obtained when kneading the polyethylene powder of the present embodiment under the above <Kneading Conditions> can be specifically measured by the method described in the Examples.

The ratio ($E_A/E_B$) can be controlled within the above numerical range by adjusting the molecular weight and density of polyethylene generated in the first half of the polymerization process, and adjusting the molecular weight and density of polyethylene generated in the latter half of the polymerization process or in the post-polymerization process.

(Kneading Energy ($E_0$) at Start of Swelling)

In the torque curve obtained when kneading the polyethylene powder of the present embodiment under the above <Kneading Conditions>, kneading energy ($E_0$) at the start of swelling is preferably 5% or less, more preferably 1% or less, and even more preferably 0.1% or less, of the total kneading energy ($E_t$).

The lower limit is not particularly limited, and is generally 0% or more.

The kneading energy ($E_0$) at the start of swelling in the present embodiment is an integrated value of torque per unit volume from the start of kneading of the polyethylene powder to the start of temperature rise. This value takes a value greater than 0 when there is a polyethylene component with a low melting point, which begins to melt before swelling, on the powder surface.

Because the kneading energy ($E_0$) at the start of swelling is 5% or less of the total kneading energy ($E_t$), the generation of unmelted materials is suppressed, and it tends to be possible to produce a microporous membrane with a more excellent appearance.

As the method for controlling the kneading energy ($E_0$) at the start of swelling, for example, the amount of comonomers is adjusted in the first half of the polymerization process.

The kneading energy ($E_0$) at the start of swelling of the present embodiment can be specifically measured by the method described in the Examples, described later.

(Median Diameter)

In the polyethylene powder of the present embodiment, the range of the median diameter is preferably 50 μm or more and 250 μm or less, more preferably 60 μm or more and 200 μm or less, and even more preferably 70 μm or more and 150 μm or less.

The median diameter of the polyethylene powder of the present embodiment is the particle diameter (D50) at which the cumulative mass is 50%.

Because the median diameter is 50 μm or more, the ease of handling the polyethylene powder (improvement of fluidity, suppression of dust, etc.) in the production process and extrusion process is improved.

In contrast, because the median diameter is 250 μm or less, the plasticizer is likely to impregnate the center of the polyethylene powder, and the generation of unmelted materials is suppressed.

As the method for controlling the median diameter of the polyethylene powder of the present embodiment within the above numerical range, for example, the particle diameter of the polymerization catalyst is controlled, or the polymerization conditions, described later, are adjusted so as to prevent the rapid progress of the polymerization reaction (hereinafter also referred to as rapid polymerization).

The median diameter of the polyethylene powder of the present embodiment can be specifically measured by the method described in the Examples, described later.

(Density)

The density range of the polyethylene powder of the present embodiment is preferably 920 kg/m$^3$ or more and 960 kg/m$^3$ or less, more preferably 930 kg/m$^3$ or more and 955 kg/m$^3$ or less, and even more preferably 935 kg/m$^3$ or more and 950 kg/m$^3$ or less.

Because the density of the polyethylene powder of the present embodiment is 920 kg/m$^3$ or more and 960 kg/m$^3$ or less, the microporous membrane using the polyethylene powder of the present embodiment has excellent balance between dimensional stability and mechanical strength.

The density of the polyethylene powder of the present embodiment can be controlled within the above numerical range, for example, by adjusting the amount of comonomers other than ethylene in the polymerization process, or by adjusting the molecular weight of the polymer.

The density of the polyethylene powder of the present embodiment can be specifically measured by the method described in the Examples, described later.

[Method for Producing Polyethylene Powder]

The method for producing the polyethylene powder of the present embodiment will be described below.

(Catalyst Component)

The polyethylene powder of the present embodiment can be produced by polymerizing ethylene, or ethylene and other comonomers, using a predetermined catalyst component.

The catalyst component used in the production of the ethylene-based polymer that constitutes the polyethylene powder of the present embodiment is not particularly limited, and examples include a Ziegler-Natta catalyst and a metallocene catalyst.

Examples of the method for producing a Ziegler-Natta catalyst or a metallocene catalyst include the methods disclosed in Japanese Patent No. 5782558 and Japanese Patent Laid-Open No. 2019-19265.

(Method for Producing Ethylene-Based Polymer)

Examples of the polymerization method of the ethylene-based polymer that constitutes the polyethylene powder of the present embodiment include a method of polymerizing ethylene or a method of copolymerizing ethylene and a comonomer, by suspension polymerization or gas-phase polymerization.

Preferred among these is suspension polymerization, which can efficiently remove the heat of polymerization.

In suspension polymerization, an inert hydrocarbon solvent can be used as a solvent. Further, an olefin itself can be used as a solvent.

The inert hydrocarbon solvent is not particularly limited, and examples include aliphatic hydrocarbons, such as propane, butane, isobutane, pentane, isopentane, hexane, heptane, octane, decane, dodecane, and kerosene; alicyclic hydrocarbons, such as cyclopentane, cyclohexane, and methylcyclopentane; aromatic hydrocarbons, such as benzene, toluene, and xylene; halogenated hydrocarbons, such as ethyl chloride, chlorobenzene, and dichloromethane; and mixtures thereof.

The polymerization temperature in the polymerization process of the ethylene-based polymer is preferably 40° C. or more and 100° C. or less, more preferably 45° C. or more and 95° C. or less, and even more preferably 50° C. or more and 90° C. or less.

A polymerization temperature of 40° C. or more enables industrially efficient production. In contrast, a polymerization temperature of 100° C. or less makes it possible to suppress the generation of massive scales when a part of the polymer melts, thus enabling continuous and stable production of the ethylene-based polymer without pipe clogging.

The polymerization pressure in the polymerization process of the ethylene-based polymer is preferably ordinary pressure or more and 2 MPaG or less, more preferably 0.2 MPaG or more and 1.5 MPaG or less, and even more preferably 0.3 MPaG or more and 0.9 MPaG or less.

A polymerization pressure equal to or higher than ordinary pressure enables industrially efficient production.

In contrast, a polymerization pressure of 2 MPaG or less makes it possible to prevent the generation of massive scales due to rapid polymerization in the polymerization reactor, and tends to enable stable production.

In general, in the polymerization of an ethylene-based polymer, it is preferable to use an antistatic agent, such as Stadis or STATSAFE produced by Innospec (distributor: Maruwa Bussan K.K.), in order to suppress electrostatic adhesion of the ethylene-based polymer to the polymerization reactor.

The antistatic agent, such as Stadis or STATSAFE, may be added to a solid catalyst in advance, but may be diluted with an inert hydrocarbon solvent and then added to the polymerization reactor by a pump or the like.

Either in the method of adding the antistatic agent to a solid catalyst in advance or the method of adding the antistatic agent to the polymerization reactor, the amount of antistatic agent added is preferably 1 ppm or more and 500 ppm or less, and more preferably 10 ppm or more and 100 ppm or less, based on the production volume of the ethylene-based polymer per unit time.

The molecular weight of the ethylene-based polymer can be adjusted, for example, by allowing hydrogen to be present in the polymerization system, or changing the polymerization temperature, as described in West German Patent Application No. 3127133. The molecular weight of the ethylene-based polymer can be controlled within an appropriate range by adding hydrogen as a chain transfer agent into the polymerization system.

When adding hydrogen into the polymerization system to control the molecular weight of the ethylene-based polymer, the range of the mole fraction of hydrogen is preferably 0 mol % or more and 50 mol % or less, and more preferably 0 mol % or more 30 mol % or less.

When adding hydrogen into the polymerization system, it is also possible to bring hydrogen into contact with the catalyst in advance, and then add it from the catalyst introduction line into the polymerization system. Immediately after the catalyst is introduced into the polymerization system, the catalyst concentration near the introduction line outlet is high; thus, rapid polymerization proceeds and the possibility of localized high temperature conditions increases. In contrast, by bringing hydrogen into contact with the catalyst before introducing them into the polymerization system, the initial activity of the catalyst can be suppressed, and it is possible to prevent the generation of massive scales due to rapid polymerization and deactivation of the catalyst at high temperatures.

The polymerization reaction can be performed in a batch, semi-continuous, or continuous manner, and preferably in a continuous manner.

By continuously supplying ethylene gas, a solvent, a catalyst, etc. into the polymerization system and continuously discharging them together with the produced ethylene-based polymer, it is possible to suppress a local high-temperature state caused by the rapid reaction of ethylene, which makes the inside of the polymerization system more stable.

When ethylene is reacted in a homogeneous polymerization system, the formation of branches, double bonds, etc. in the polymer chains is suppressed, or the formation of low-molecular-weight components and ultra-high-molecular-weight substances due to decomposition and crosslinking of the ethylene polymer is suppressed, and crystalline components of the ethylene-based polymer are easily generated. As a result, it becomes easier to obtain the crystalline components in an amount necessary and sufficient to achieve strength required for films, microporous membranes, and the like.

The polymerization reaction of the ethylene-based polymer may be performed by a single-stage polymerization method using one polymerization reactor, or a multistage polymerization method in which polymerization is performed continuously in sequence in two or more polymerization reactors connected in series. In terms of capable of efficiently controlling the structure of the surface and center of the polyethylene powder, it is preferable to use a multistage polymerization method.

The production of an ethylene-based polymer using a multistage polymerization method is specifically performed in the following manner.

First, an ethylene-based polymer X is produced in a first-stage polymerization reactor using the above production conditions, and the ethylene-based polymer X extracted from the first-stage polymerization reactor is transferred to an intermediate flash tank to separate unreacted ethylene and hydrogen, and comonomers when copolymerization is performed in the first-stage polymerization reactor.

Then, the suspension containing the ethylene-based polymer X is transferred to a second-stage polymerization reactor, and an ethylene-based polymer Y is produced using the above production conditions.

The difference between the temperature of the first-stage polymerization reactor and the temperature of the second-stage polymerization reactor preferably satisfies the following <Formula 1>, more preferably satisfies the following <Formula 2>, and even more preferably satisfies the following <Formula 3>.

It is assumed that the second stage is the final stage.

(Temperature of second-stage reactor)−(temperature of first-stage reactor)≥20° C.     <Formula 1>

(Temperature of second-stage reactor)−(temperature of first-stage reactor)≥25° C.     <Formula 2>

(Temperature of second-stage reactor)−(temperature of first-stage reactor)≥30° C.     <Formula 3>

The lower the polymerization temperature, the more suppressed the motion of the growing molecular chains of the ethylene-based polymer and the less entanglement of the generated molecular chains. Therefore, by performing low-temperature polymerization in the first-stage polymerization reactor, it is possible to generate molecular chains with less entanglement on the surface of the polyethylene powder. Thus, the surface of the polyethylene powder is easily stretched by the pressure from the molecular chains in the ethylene-based polymer generated in the second-stage polymerization reactor.

Further, by performing high-temperature polymerization in the second-stage polymerization reactor, the mobility of the molecular chains on the surface of the polyethylene powder is improved, and the pressure from the molecular chains growing inside the polyethylene powder is increased. From these, by satisfying the above <Formula 1> to <Formula 3>, the amount of entanglement of molecular chains on the surface of the polyethylene powder is small, and the molecular chains are easily dispersed in the kneading process. In addition, the pores are sufficiently expanded, and the impregnability of the plasticizer can be further enhanced.

In terms of accurately controlling the physical properties of the ethylene-based polymer Y, the pressure of the intermediate flash tank described above is preferably 0.01 MPaG or more and 0.2 MPaG or less. Moreover, in terms of stretching the surface of the polyethylene powder containing the ethylene-based polymer X generated in the first-stage polymerization reactor and increasing the incorporation efficiency of the ethylene monomer into the center of the polyethylene powder in the second-stage polymerization reactor, the temperature of the intermediate flash tank is preferably 70° C. or more and 100° C. or less. Further, it is preferable to feed comonomers into the flash tank.

The ratio of the ethylene-based polymer Y contained in the polyethylene powder produced by the multistage polymerization method described above, that is, the range of the production volume of the ethylene polymer in the second-stage polymerization reactor, i.e., the content, is preferably 30% to 70%, more preferably 35% to 65%, and even more preferably 40% to 65%.

Because the content of the ethylene polymer Y is 30% or more, the pores on the surface of the polyethylene powder can be expanded to further enhance the impregnability of the plasticizer.

In contrast, as the content of the ethylene polymer Y increases, lower activation and shortened residence time in the first-stage polymerization reactor, or higher activation and extended residence time in the second-stage polymerization reactor is necessary. Therefore, because the content of the ethylene polymer Y is 70% or less, stable production is possible without extreme conditions for the temperature and pressure of each polymerization reactor.

As for the ethylene-based polymer X obtained in the first-stage polymerization reactor described above, in terms of preventing pore clogging before swelling during extrusion processing, the density range is preferably 930 kg/m$^3$ or more and 960 kg/m$^3$ or less, more preferably 935 kg/m$^3$ or more and 960 kg/m$^3$ or less, and even more preferably 940 kg/m$^3$ or more and 960 kg/m$^3$ or less.

The range of the viscosity average molecular weight of the ethylene-based polymer X is not particularly limited, as long as the viscosity average molecular weight of the finally generated polyethylene powder is within the above range.

As for the ethylene-based polymer Y obtained in the second-stage polymerization reactor described above, in terms of expanding the pores on the surface of the polyethylene powder and reducing the amount of plasticizer required during molding, the density range is preferably 920 kg/m$^3$ or more and 950 kg/m$^3$ or less, and more preferably 920 kg/m$^3$ or more and 945 kg/m$^3$ or less.

The range of the viscosity average molecular weight of the ethylene-based polymer Y is not particularly limited, as long as the viscosity average molecular weight of the finally generated polyethylene powder is within the above range; however, in terms of reducing the amount of plasticizer required during molding, this range is preferably 10,000 or more and 2,000,000 or less, and more preferably 10,000 or more and 1,500,000 or less.

As the physical property values of the ethylene-based polymer Y, the viscosity average molecular weight and density can be determined in such a manner that after the physical property values of the ethylene-based polymer X extracted from the first-stage polymerization reactor and the finally produced polyethylene powder are measured, the viscosity average molecular weight and density can be determined based on additivity from the production volume of each polymerization reactor.

The suspension containing the ethylene-based polymer that constitutes the polyethylene powder of the present embodiment is quantitatively extracted from the polymerization reactor and transferred to a final flash tank to separate unreacted ethylene and hydrogen, and other comonomers when copolymerization is performed in the polymerization reactor. In terms of stretching the surface of the polyethylene powder obtained in the polymerization reactor, the pressure of the final flash tank is preferably 0.05 MPaG or more and 0.5 MPaG or less, and the temperature is preferably 70° C. or more and 100° C. or less. Further, it is preferable to feed other comonomers.

In the method for producing the ethylene-based polymer that constitutes the polyethylene powder of the present embodiment, the solvent is separated after the polymerization process. As the solvent separation method, any of decantation, centrifugal separation, filter filtration, and the like can be applied; however, centrifugal separation is more preferred because it can separate the ethylene-based polymer and the solvent efficiently.

The solvent content of the ethylene-based polymer after solvent separation is not particularly limited, but is preferably 20 mass % or more and 70 mass % or less, and more preferably 30 mass % or more and 60 mass % or less, based on the mass of the ethylene-based polymer.

Because the solvent content is 20 mass % or more, post-polymerization tends to progress at the center of the polyethylene powder, and the surface of the polyethylene powder tends to be stretched.

In contrast, because the solvent content is 70 mass % or less, the low-molecular-weight component, i.e., wax, contained in the solvent is less likely to remain in the polyethylene powder, and it is possible to suppress reduction in heat resistance of the microporous membrane due to inclusion of wax.

In the method for producing the ethylene-based polymer that constitutes the polyethylene powder of the present embodiment, the catalyst used in the polymerization process is deactivated after the polymerization process. Although it is not particularly limited, the deactivation of the catalyst is preferably performed after separating the ethylene-based polymer and the solvent.

By introducing an agent to deactivate the catalyst after solvent separation, low-molecular-weight components, catalyst components, etc. contained in the solvent can be prevented from being precipitated in the ethylene polymer.

Examples of catalyst-deactivating agents include oxygen, water, alcohols, glycols, phenols, carbon monoxide, carbon dioxide, ethers, carbonyl compounds, and alkynes.

In the method for producing the ethylene-based polymer that constitutes the polyethylene powder of the present embodiment, a drying process is performed after the solvent is separated.

In the drying process, it is preferable to use a rotary kiln method, a paddle method, a fluidized bed drying method, etc.

The drying temperature is preferably 50° C. or more and 150° C. or less, and more preferably 70° C. or more and 110° C. or less.

It is also effective to introduce an inert gas such as nitrogen into the dryer to promote drying. In that case, a method of entraining steam etc. as an agent to deactivate the catalyst is also more effective.

After drying the ethylene-based polymer that constitutes the polyethylene powder of the present embodiment, the resultant may be sieved to remove coarse particles.

The polyethylene powder of the present embodiment may be a mixture of multiple polyethylene powders including an ethylene-based polymer obtained by the above production method.

If necessary, the polyethylene powder of the present embodiment may be used in combination with known additives, such as slip agents, neutralizers, antioxidants, light-resistant stabilizers, antistatic agents, and pigments.

Examples of slip agents or neutralizers include, but are not particularly limited to, aliphatic hydrocarbons, higher fatty acids, higher fatty acid metal salts, fatty acid esters of alcohols, waxes, higher fatty acid amides, silicone oil, and rosin. Specifically, calcium stearate, magnesium stearate, zinc stearate, and other stearates can be used as preferable additives.

Preferred examples of antioxidants include, but are not particularly limited to, phenol-based compounds, phenol phosphate-based compounds, and phosphorus-based compounds. Specific examples include phenol-based antioxidants, such as 2,6-di-t-butyl-4-methylphenol(dibutylhydroxytoluene), n-octadecyl-3-(4-hydroxy-3,5-di-t-butylphenyl)propionate, and tetrakis(methylene(3,5-di-t-butyl-4-hysaloxyhydrocinnamate))methane; phenol phosphate-based antioxidants, such as 6-[3-(3-t-butyl-4-hydroxy-5-methylphenyl)propoxy]-2,4,8,10-tetra-t-butyldibenzo[d,f][1,3,2]dioxaphosphepin; and phosphate-based antioxidants, such as tetrakis(2,4-di-t-butylphenyl)-4,4'-biphenylene-di-phosphonite, tris(2,4-di-t-butylphenyl) phosphite, and cyclic neopentanetetraylbis(2,4-t-butylphenylphosphite).

Examples of light-resistant stabilizers include, but are not particularly limited to, benzotriazole-based light-resistant stabilizers, such as 2-(5-methyl-2-hydroxyphenyl)benzotriazole and 2-(3-t-butyl-5-methyl-2-hydroxyphenyl)-5-chlorobenzotriazole; and hindered amine-based light-resistant stabilizers, such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}].

Examples of antistatic agents include, but are not particularly limited to, aluminosilicate, kaolin, clay, natural silica, synthetic silica, silicates, talc, diatomaceous earth, and glycerol fatty acid esters.

[Applications]

The polyethylene powder of the present embodiment can be used as a raw material for various molded articles, such as microporous membranes, high-strength fibers, sintered compacts, press-molded articles, and ram press-molded articles. In particular, the polyethylene powder of the present embodiment is suitable as a raw material for microporous membranes for battery separators.

[Molded Article]

The molded article of the present embodiment is a molded article of the polyethylene powder of the present embodiment described above.

The molded article of the present embodiment is obtained, for example, by introducing the polyethylene powder of the present embodiment into an extruder, and molding it into a desired shape, such as a sheet shape, followed by a drying process.

Examples of the molded article of the present embodiment include microporous membranes, specifically battery separators, and more specifically lithium ion secondary battery separators, lead-acid battery separators, and the like.

Examples of the method for producing the microporous membrane include a molding method comprising the steps of extruding, drawing, extracting, and drying resin using a wet extrusion method.

EXAMPLES

The present embodiment will be described in more detail below by way of specific Examples and Comparative Examples; however, the present embodiment is not limited by the following Examples and Comparative Examples.

The methods for evaluating various characteristics and physical properties will be described below.

[Physical Properties of Polyethylene Powder]

The methods for evaluating the physical properties of the polyethylene powder will be described.

(Viscosity Average Molecular Weight (Mv))

The viscosity average molecular weight of the polyethylene powder was measured according to ISO1628-3 (2010) in the following manner.

First, the polyethylene powder was weighed in the range of 4.0 to 4.5 mg into a dissolution tube. The weighed mass is expressed as "m (unit: mg)" in the following mathematical formula. After the air inside the dissolution tube was removed by a vacuum pump and replaced with nitrogen, 20 mL of decahydronaphthalene (containing 1 g/L of 2,6-di-t-butyl-4-methylphenol; hereinafter referred to as decalin) deaerated by a vacuum pump and replaced with nitrogen was added, and the mixture was stirred at 150° C. for 90 minutes to dissolve the polyethylene powder, thereby obtaining a decalin solution.

Thereafter, the decalin solution was placed in a Cannon-Fenske viscometer (produced by Sibata Scientific Technology Ltd./viscometer number: 100) in a constant temperature liquid bath at 135° C., and the falling time between gauge lines (ts) was measured.

Further, the falling time of decalin alone (tb) without the polyethylene powder was measured as a blank, and the specific viscosity (ηsp) was determined according to the following (mathematical formula A).

$$\eta sp=(ts/tb)-1 \qquad \text{(mathematical formula A)}$$

From the specific viscosity (ηsp) and concentration (C) (unit: g/dL), the intrinsic viscosity IV was calculated using the following (mathematical formula B) and (mathematical formula C).

$$\text{Concentration } C=m/(20\times\gamma)/10(\text{unit:g/dL}) \qquad \text{(mathematical formula B)}$$

$$\gamma=(\text{density of decalin at } 20°\text{ C.(unit:g/mL)})/(\text{density of decalin at } 135°\text{ C.(unit:g/mL)})=0.888/0.802=1.107$$

$$\text{Intrinsic viscosity IV}=(\eta sp/C)/(1+0.27\times\eta sp) \qquad \text{(mathematical formula C)}$$

The intrinsic viscosity IV was assigned to the following (mathematical formula D) to determine the viscosity average molecular weight (Mv).

$$\text{Viscosity average molecular weight(Mv)}=(5.34\times10^{4})\times[\eta]^{1.49} \qquad \text{(mathematical formula D)}$$

(Slope of Straight Line Connecting Two Local Maximum Points in Torque Curve)

The slope of a straight line connecting two local maximum points in a torque curve obtained when kneading the polyethylene powder was determined in the following manner.

First, 24 g of liquid paraffin (product name: P-350P) produced by MORESCO Corporation was placed in a Labo Plastomill Mixer, produced by Toyo Seiki Seisaku-sho, Ltd. (unit model: 30C150, mixer model: R-60) set at a temperature of 114° C., and kneaded at a rotation speed of 5 rpm for 10 minutes.

A mixture of 16 g of the polyethylene powder and 0.4 g of tetrakis[methylene(3,5-di-t-butyl-4-hydroxy-hydrocinnamate)]methane (product name: ANOX20) produced by Great Lakes Chemical Japan Corp. mixed well in advance in a resin container was added to the liquid paraffin, and the mixture was kneaded at a rotation speed of 30 rpm for 3 minutes.

After that, kneading was performed while raising the set temperature from 114° C. to 163° C. over 1 minute without changing the rotation speed. After raising the temperature, the mixture was kneaded for 5 minutes at a set temperature of 163° C. and a rotation speed of 30 rpm.

Next, a torque curve was obtained by plotting the average torque (rotational load generated during kneading) calculated by Labo Plastomill Mixer Test Program Ver. 4.52 (Copyright (C) Toyo Seiki Seisaku-sho, Ltd.) on the vertical axis, and the kneading time on the horizontal axis. At this time, the average torque value was plotted every 0.125 seconds.

Then, for the first local maximum point A and the second local maximum point B in this torque curve, the kneading elapsed times ($t_A$, $t_B$) and torque values ($P_A$, $P_B$) were read, and the slope of a straight line connecting the two local maximum points (N·m/min) was determined by the following formula.

$$\text{(Slope of straight line)}=(P_B-P_A)/(t_B-t_A)$$

(Ratio ($E_A/E_B$) of Kneading Energy ($E_A$) During Swelling to Kneading Energy ($E_B$) During Melting in Torque Curve)

The ratio of kneading energy ($E_A$) during swelling to kneading energy ($E_B$) during melting in the torque curve was determined in the following manner.

In the torque curve obtained when determining the [Slope of Straight Line Connecting Two Local Maximum Points in Torque Curve] described above, an integrated value of torque per unit volume from the point where the temperature rise started to the local minimum point between the first and second peaks was calculated, and the calculated value was taken as the kneading energy ($E_A$) during swelling.

Further, an integrated value of torque per unit volume from the local minimum point between the first and second peaks to the kneading end point was calculated, and the calculated value was taken as the kneading energy ($E_B$) during melting.

The ratio of $E_A$ to $E_B$, ($E_A/E_B$), was determined.

(Percentage of Kneading Energy ($E_0$) at Start of Swelling in Total Kneading Energy ($E_t$))

Kneading energy ($E_0$) at the start of swelling was determined in the following manner.

In the torque curve obtained when determining the [Slope of Straight Line Connecting Two Local Maximum Points in Torque Curve] described above, an integrated value of torque per unit volume from the starting point of kneading of the polyethylene powder to the starting point of temperature rise was calculated, and the calculated value was taken as the kneading energy ($E_0$) at the start of swelling.

Further, an integrated value of torque per unit volume from the kneading start point to the kneading end point was calculated, and the calculated value was taken as the total kneading energy ($E_t$).

The percentage of the kneading energy ($E_0$) at the start of swelling in the total kneading energy ($E_t$) was determined by the following formula.

$$(\text{Percentage of } E_0 (\%)) = (E_0/E_t) \times 100$$

(Median Diameter)

The median diameter of the polyethylene powder was determined in the following manner.

The polyethylene powder was classified with a sieve according to JIS Z8801 standard. The sieve mesh sizes used were 425 μm, 300 μm, 212 μm, 150 μm, 106 μm, 75 μm, and 53 μm, and the mass of the polyethylene powder collected for each fraction was measured. Then, the fraction (mass %) of each fraction to the total mass of the polyethylene powder before classification was calculated, and the cumulative undersize percentage (mass %), which is the percentage integrated from the smaller mesh size, was determined. A cumulative undersize distribution graph with the horizontal axis representing the mesh size and the vertical axis representing the cumulative undersize percentage, that is, a particle size distribution cumulative curve (cumulative curve from small particles), was drawn, and the median diameter was defined as the horizontal axis value (D50 (μm)) at which the cumulative undersize percentage was 50%.

(Density)

The density of the polyethylene powder was determined by the methods (1) to (7) shown below.

(1) The polyethylene powder was placed in a mold of 100 mm×100 mm×2 mm thick.

(2) The polyethylene powder was preheated by a press machine with a set temperature of 190° C. at 10 kg/cm² for 3 minutes, defoamed three times, and pressed at 15 kg/cm² for 2 minutes.

(3) The mold was cooled to room temperature by a cooling press.

(4) A piece of 20 mm×20 mm×2 mm thick was cut out from the obtained pressed sheet.

(5) The cut piece was placed in a test tube and heated at 120° C. for 1 hour in a nitrogen atmosphere.

(6) After heating, the piece was cooled at 20° C. for 1 hour, and a molded article sample for density measurement was obtained.

(7) The density of the molded article sample was measured according to JIS K7112:1999 (D method), and the obtained value was taken as the density of the polyethylene powder (kg/m³).

[Production of Microporous Membrane and Evaluation of Characteristics]

(Method for Producing Microporous Membrane)

1 part by mass of pentaerythrityl-tetrakis-[3-(3,5-di-t-butyl-4-hydroxyphenyl)propionate] was added as an anti-oxidant to 45 parts by mass of the polyethylene powder of each of the Examples and Comparative Examples, and the mixture was dry-blended using a tumbler blender, thereby obtaining a powder mixture.

After nitrogen replacement, the obtained powder mixture was injected into a twin-screw extruder through a feeder under a nitrogen atmosphere.

Further, 55 parts by mass of liquid paraffin (P-350P (trademark), produced by MORESCO Corporation) was injected into the twin-screw extruder by side feeding. The mixture was kneaded at 160° C., extruded through a T-die installed at the tip of the extruder, and then immediately cooled and solidified on a cast roll cooled to 25° C. to form a gel-like sheet with a thickness of 1200 μm.

This gel-like sheet was stretched 7×7 times at 115 to 125° C. using a simultaneous biaxial stretching machine, and the stretched film was immersed in methyl ethyl ketone for 30 minutes to remove the liquid paraffin by extraction, followed by drying.

The film was further heat-set at 115° C. to 125° C. for 3 minutes to obtain a microporous membrane.

The stretching temperature and heat-setting temperature were appropriately adjusted for each microporous membrane within the specified temperatures.

(Evaluation of Number of Defects in Microporous Membrane)

The number of defects present in the microporous membrane of 250 mm×250 mm obtained by the (Method for Producing Microporous Membrane) described above was visually counted. When the microporous membrane was observed with transmitted light, impurities such as dust observed as black spots were excluded.

Then, based on the counted number, the number of defects was evaluated according to the following evaluation criteria.

<Evaluation Criteria>

⊚ (good): 1 or less

○ (normal): 2 or more and less than 5

X (bad): 5 or more (Evaluation of Uniformity of Pore Structure of Microporous Membrane)

8 films of 100 mm×50 mm were punched out from the microporous membrane of 250 mm×250 mm obtained by the (Method for Producing Microporous Membrane) described above. For each microporous membrane, the air resistance prescribed in JIS P-8117 was measured using a Digital Oken Type Air-permeability tester (model: EGO1) produced by Asahi Seiko Co., Ltd.

The measurement was performed at 3 points per microporous membrane of 100 mm×50 mm.

Then, the standard deviation of 24 measurements in total was calculated, and the uniformity of air permeability was evaluated according to the following evaluation criteria. This was used for the evaluation of the uniformity of the pore structure of the microporous membrane.

<Evaluation Criteria>

⊚ (good): less than 10 sec

○ (normal): 10 sec or more and less than 20 sec

X (bad): 20 sec or more (Evaluation of Shutdown Temperature of Microporous Membrane)

The microporous membrane obtained by the (Method for Producing Microporous Membrane) described above was impregnated with an electrolytic solution, a cell was produced by sandwiching this membrane between SUS plate electrodes, and the AC resistance of the cell was measured while the temperature was raised.

Then, the temperature at which the resistance suddenly increased was taken as the shutdown temperature, and evaluated according to the following evaluation criteria.

<Evaluation Criteria>

⊚ (good): less than 132° C.

○ (normal): 132° C. or more and less than 134° C.

X (bad): 134° C. or more

Production Example 1

(Preparation of Ziegler-Natta Catalyst (A))

A Ziegler-Natta Catalyst (A) was prepared according to the following (1) to (4).

<(1) Synthesis of Raw Material (a-1)>

2,000 mL (equivalent to 2000 mmol of magnesium and aluminum) of a hexane solution of 1 mol/L of $Mg_6(C_4H_9)_{12}AL(C_2H_5)_3$ was placed in an 8L stainless steel autoclave fully purged with nitrogen. While stirring at 50° C., 146 mL of a 5.47 mol/L n-butanol hexane solution was added dropwise over 3 hours from a feed line connected to the autoclave. After completion of dropping, the line was washed with 300 mL of hexane. Further, stirring was continued at 50° C. over 2 hours. After completion of the reaction, the resultant was cooled to room temperature and used as a raw material (a-1). The raw material (a-1) was organomagnesium with a magnesium concentration of 0.704 mol/L.

<(2) Synthesis of Raw Material (a-2)>

2,000 mL (equivalent to 2000 mmol of magnesium and aluminum) of a hexane solution of 1 mol/L of $Mg_6(C_4H_9)_{12}AL(C_2H_5)_3$ was placed in an 8L stainless steel autoclave fully purged with nitrogen. While stirring at 80° C., 240 mL of a hexane solution of 8.33 mol/L of methylhydrogenpolysiloxane (produced by Shin-Etsu Chemical Co., Ltd.) was pumped, and stirring was further continued at 80° C. over 2 hours. After completion of the reaction, the reactant was cooled to room temperature and used as a raw material (a-2). The raw material (a-2) had a total concentration of magnesium and aluminum of 0.786 mol/L.

<(3) Synthesis of Carrier (a-3)>

1,000 mL of a hexane solution of 1 mol/L of hydroxytrichlorosilane was placed in an 8L stainless steel autoclave fully purged with nitrogen, 1340 mL (equivalent to 943 mmol of magnesium) of a hexane solution of the organomagnesium compound as the raw material (a-1) was added dropwise at 65° C. over 3 hours, and the reaction was further continued while stirring at 65° C. for 1 hour. After completion of the reaction, the supernatant was removed, followed by washing four times with 1,800 mL of hexane, thereby obtaining a carrier (a-3). As a result of analyzing this carrier, 7.5 mmol of magnesium was contained per gram of solid.

<(4) Preparation of Ziegler-Natta Catalyst (A)>

To 1,970 mL of a hexane slurry containing 110 g of the carrier (a-3) stirred at 10° C. in an 8L stainless steel autoclave fully purged with nitrogen, 103 mL of a hexane solution of 1 mol/L of titanium tetrachloride and 131 mL of the raw material (a-2) were added simultaneously over 3 hours. After addition, the reaction was continued at 10° C. for 1 hour. After completion of the reaction, the supernatant was removed, followed by washing four times with hexane to remove unreacted raw material components, thereby preparing the Ziegler-Natta catalyst (A).

(Preparation of Ziegler-Natta Catalyst (B))

1,600 mL of hexane was added to an 8L stainless steel autoclave fully purged with nitrogen.

While stirring at 10° C., 800 mL of a hexane solution of 1 mol/L of titanium tetrachloride and 800 mL of the raw material (a-2) were added simultaneously over 5 hours.

The reaction was continued at 10° C. for 1 hour. After completion of the reaction, the supernatant was removed, followed by washing four times with hexane to remove unreacted raw material components, thereby preparing a Ziegler-Natta catalyst (B).

[Production of Polyethylene Powder and Microporous Membrane]

Example 1

As shown below, an ethylene-based polymer ($X_A$) was polymerized in the first-stage reactor, and an ethylene-based polymer ($Y_A$) was polymerized in the second-stage reactor, thereby obtaining a polyethylene powder (A).

The polyethylene powder (A) had a viscosity average molecular weight of 270,000, a density of 945 kg/m$^3$, and a median diameter of 89 μm.

The above various evaluations were performed on the polyethylene powder (A), and a microporous membrane of the polyethylene powder (A) produced by the (Method for Producing Microporous Membrane) described above, and the results are shown in Table 1.

<(1) Polymerization of Ethylene-Based Polymer ($X_A$)>

The ethylene-based polymer was polymerized using a vessel type 300L polymerization reactor equipped with three swept-back stirring blades and three baffles.

As a solvent, normal hexane was supplied at a flow rate of 40 L/h, and the stirring speed was set to 230 rpm. As a polymerization catalyst, the Ziegler-Natta catalyst (A) was used and supplied so that the production speed of the ethylene-based polymer was 7.1 kg/h. The antistatic agent STATSAFE 3000 (90 g/L) produced by Innospec diluted with normal hexane was added to the polymerization catalyst in an amount of 20 mass ppm with respect to the production speed of the ethylene-based polymer.

As a cocatalyst component, a mixture of triisobutylaluminum and diisobutylaluminum hydride (9:1) was used and supplied at 10 mmol/h. 23 mol % (molar ratio: hydrogen/(ethylene+hydrogen)) of hydrogen was supplied. The polymerization temperature was set to 50° C., the polymerization pressure was set to 0.37 MPaG, and the average residence time was set to 3.3 hours.

The ethylene-based polymer ($X_A$) obtained as described above had a viscosity average molecular weight of 680,000 and a density of 943 kg/m$^3$. Further, the polymerization activity in the first-stage reactor was 20,600 g per gram of the catalyst.

The polymerization slurry in the polymerization reactor was guided to an intermediate flash tank with a pressure of 0.13 MPaG and a temperature of 80° C. so that the level in the polymerization reactor was kept constant, and unreacted ethylene and hydrogen were separated. 15 mol % (molar ratio: (1−butene)/(ethylene+hydrogen+(1-butene))) of 1-butene was supplied to the intermediate flash tank, and the average residence time was set to 1.3 hours.

<(2) Polymerization of Ethylene-Based Polymer ($Y_A$)>

The polymerization slurry containing the ethylene-based polymer ($X_A$) was transferred from the intermediate flash tank to a vessel type 300L polymerization reactor equipped with three swept-back stirring blades and three baffles, followed by polymerization of the ethylene-based polymer ($Y_A$).

The stirring speed was set to 196 rpm, and as a cocatalyst component, a mixture of triisobutylaluminum and diisobutylaluminum hydride (9:1) was supplied at 10 mmol/h. 26 mol % (molar ratio: hydrogen/(ethylene+hydrogen+(1-butene))) of hydrogen was supplied, and 5.2 mol % (molar ratio: (1-butene)/(ethylene+hydrogen+(1-butene))) of 1-butene was supplied as a comonomer. The polymerization temperature was set to 83° C., the polymerization pressure was set to 0.58 MPaG so that the production speed was 12.7 kg/h, and the average residence time was set to 0.75 hours. The thus-obtained ethylene-based polymer $(Y_A)$ had a viscosity average molecular weight of 40,000 and a density of 946 kg/m$^3$. Further, the polymerization activity in the second-stage reactor was 8,300 g per gram of the catalyst.

The polymerization slurry in the polymerization reactor was guided to a final flash tank with a pressure of 0.05 MPaG and a temperature of 80° C. so that the level in the polymerization reactor was kept constant, and unreacted ethylene and hydrogen were separated. The average residence time in the final flash tank was set to 1 hour.

Next, the polymerization slurry was continuously transferred by a pump from the flash tank to a centrifuge, and the polymer and the solvent were separated. Then, the separated ethylene-based polymer was transferred to a rotary kiln dryer controlled to 85° C., and dried while blowing nitrogen, thereby obtaining a polyethylene powder (A).

In this drying process, the polyethylene powder was sprayed with steam to deactivate the catalyst and cocatalyst.

Example 2

As shown below, an ethylene-based polymer $(X_B)$ was polymerized in the first-stage reactor, and an ethylene-based polymer $(Y_B)$ was polymerized in the second-stage reactor, thereby obtaining a polyethylene powder (B).

The polyethylene powder (B) had a viscosity average molecular weight of 290,000, a density of 942 kg/m$^3$ and a median diameter of 96 μm.

The above various evaluations were performed on the polyethylene powder (B), and a microporous membrane of the polyethylene powder (B) produced by the (Method for Producing Microporous Membrane) described above, and the results are shown in Table 1.

(3) Polymerization of Ethylene-Based Polymer $(X_B)$>

Polymerization was carried out in the same manner as in the polymerization of $(X_A)$ in Example 1, except that the production speed was changed to 7.2 kg/h, the amount of hydrogen supplied was changed to 16 mol %, the polymerization temperature was changed to 57° C., and the polymerization pressure was changed to 0.3 MPaG, thereby obtaining an ethylene-based polymer $(X_B)$. The obtained ethylene-based polymer $(X_B)$ had a viscosity average molecular weight of 690,000 and a density of 942 kg/m$^3$. Further, the polymerization activity in the first-stage reactor was 30,000 g per gram of the catalyst.

The polymerization slurry in the polymerization reactor was guided to an intermediate flash tank that was set under the same conditions as for $(X_A)$ of Example 1, except that the pressure was changed to 0.1 MPaG.

<(4) Polymerization of Ethylene-Based Polymer $(Y_B)$>

Polymerization was carried out in the same manner as in the polymerization of $(Y_A)$ in Example 1, except that the production speed was changed to 11.8 kg/h, the amount of hydrogen supplied was changed to 22 mol %, the polymerization temperature was changed to 85° C., the polymerization pressure was changed to 0.56 MPaG, and the amount of 1-butene supplied was changed to 7.4 mol %, thereby obtaining an ethylene-based polymer $(Y_B)$. The obtained ethylene-based polymer $(Y_B)$ had a viscosity average molecular weight of 45,000 and a density of 942 kg/m$^3$. Further, the polymerization activity in the second-stage reactor was 11,000 g per gram of the catalyst.

The polymerization slurry in the polymerization reactor was guided to a final flash tank that was set under the same conditions as for $(Y_A)$ of Example 1, except that 15 mol % of 1-butene was supplied. Then, the polymerization slurry was separated and dried in the same manner as for $(Y_A)$ of Example 1, thereby obtaining a polyethylene powder (B).

Example 3

As shown below, an ethylene-based polymer $(X_C)$ was polymerized in the first-stage reactor, and an ethylene-based polymer $(Y_C)$ was polymerized in the second-stage reactor, thereby obtaining a polyethylene powder (C).

The polyethylene powder (C) had a viscosity average molecular weight of 240,000, a density of 944 kg/m$^3$, and a median diameter of 102 μm.

The above various evaluations were performed on the polyethylene powder (C), and a microporous membrane of the polyethylene powder (C) produced by the (Method for Producing Microporous Membrane) described above, and the results are shown in Table 1.

<(5) Polymerization of Ethylene-Based Polymer $(X_C)$>

Polymerization was carried out in the same manner as in the polymerization of $(X_A)$ in Example 1, except that the production speed was changed to 12.8 kg/h, the amount of hydrogen supplied was changed to 44 mol %, the polymerization temperature was changed to 78° C., the polymerization pressure was changed to 0.65 MPaG, the average residence time was changed to 3 hours, and 5.7 mol % of 1-butene was supplied as a comonomer, thereby obtaining an ethylene-based polymer $(X_C)$. The obtained ethylene-based polymer $(X_C)$ had a viscosity average molecular weight of 60,000 and a density of 947 kg/m$^3$. Further, the polymerization activity in the first-stage reactor was 57,000 g per gram of the catalyst.

The polymerization slurry in the polymerization reactor was guided to an intermediate flash tank that was set under the same conditions as for $(X_A)$ of Example 1, except that the pressure was changed to 0.2 MPaG.

<(6) Polymerization of Ethylene-Based Polymer $(Y_C)$>

Polymerization was carried out in the same manner as in the polymerization of $(Y_A)$ in Example 1, except that the production speed was changed to 7.2 kg/h, the amount of hydrogen supplied was changed to 3 mol %, the polymerization temperature was changed to 78° C., the polymerization pressure was changed to 0.29 MPaG, the amount of 1-butene supplied was changed to 1.1 mol %, and the average residence time was changed to 0.82 hours, thereby obtaining an ethylene-based polymer $(Y_C)$.

The obtained ethylene-based polymer $(Y_C)$ had a viscosity average molecular weight of 560,000 and a density of 939 kg/m$^3$. Further, the polymerization activity in the second-stage reactor was 8,500 g per gram of the catalyst.

The polymerization slurry in the polymerization reactor was guided to a final flash tank that was set under the same conditions as for $(Y_B)$ of Example 2. Then, the polymerization slurry was separated and dried in the same manner as for $(Y_A)$ of Example 1, thereby obtaining a polyethylene powder (C).

Example 4

<(7) Polymerization of Polyethylene Powder (D)>

The polyethylene powder was polymerized using a vessel type 300L polymerization reactor equipped with three swept-back stirring blades and three baffles.

As a solvent, normal hexane was supplied at a flow rate of 80 L/h, and the stirring speed was set to 230 rpm. As a polymerization catalyst, the Ziegler-Natta catalyst (A) was used and supplied so that the production speed of the polyethylene powder was 9 kg/h.

The antistatic agent STATSAFE 3000 (90 g/L) produced by Innospec diluted with normal hexane was added to the polymerization catalyst in an amount of 20 mass ppm with respect to the production speed of the polyethylene powder.

As a cocatalyst component, a mixture of triisobutylaluminum and diisobutylaluminum hydride (9:1) was used and supplied at 10 mmol/h. 2.7 mol % (molar ratio: hydrogen/(ethylene+hydrogen)) of hydrogen was supplied. The polymerization temperature was set to 78° C., the polymerization pressure was set to 0.3 MPaG, and the average residence time was set to 1.7 hours. The polymerization slurry in the polymerization reactor was guided to a final flash tank with a pressure of 0.3 MPaG and a temperature of 80° C. so that the level in the polymerization reactor was kept constant, and unreacted ethylene and hydrogen were separated. 15 mol % (molar ratio: (1-butene)/(ethylene+hydrogen+(1-butene))) of 1-butene was supplied to the final flash tank, and the average residence time in the final flash tank was set to 1 hour.

Next, the polymerization slurry was continuously transferred by a pump from the flash tank to a centrifuge, and the polymer and the solvent were separated. Then, the separated polyethylene powder was transferred to a rotary kiln dryer controlled to 85° C. and dried while blowing nitrogen.

In this drying process, the polyethylene powder was sprayed with steam to deactivate the catalyst and cocatalyst.

The polyethylene powder (D) obtained as described above had a viscosity average molecular weight of 700,000, a density of 936 kg/m³, and a median diameter of 108 μm. Further, the polymerization activity in the reactor was 11,500 g per gram of the catalyst. The above various evaluations were performed on the polyethylene powder (D), and a microporous membrane of the polyethylene powder (D) produced by the (Method for Producing Microporous Membrane) described above, and the results are shown in Table 1.

Example 5

50 parts by mass of the polyethylene powder (D) was added to 50 parts by mass of a polyethylene powder (E) polymerized as shown below, and the mixture was dry-blended using a tumbler blender, thereby obtaining a polyethylene powder (F).

The polyethylene powder (F) had a viscosity average molecular weight of 500,000, a density of 941 kg/m³ and a median diameter of 99 μm.

The above various evaluations were performed on the polyethylene powder (F), and a microporous membrane of the polyethylene powder (F) produced by the (Method for Producing Microporous Membrane) described above, and the results are shown in Table 1.

(8) Polymerization of Polyethylene Powder (E)>

Polymerization was carried out under the same conditions as in Example 4, except that the amount of hydrogen added was changed to 6 mol %. The obtained polyethylene powder (E) had a viscosity average molecular weight of 300,000, a density of 945 kg/m³, and a median diameter of 90 μm.

Further, the polymerization activity in the reactor was 11,600 g per gram of the catalyst.

Example 6

As shown below, an ethylene-based polymer ($X_G$) was polymerized in the first-stage reactor, and an ethylene-based polymer ($Y_G$) was polymerized in the second-stage reactor, thereby obtaining a polyethylene powder (G).

The polyethylene powder (G) had a viscosity average molecular weight of 900,000, a density of 941 kg/m³ and a median diameter of 90 μm.

The above various evaluations were performed on the polyethylene powder (G), and a microporous membrane of the polyethylene powder (G) produced by the (Method for Producing Microporous Membrane) described above, and the results are shown in Table 1.

(9) Polymerization of Ethylene-Based Polymer ($X_G$)>

Polymerization was carried out in the same manner as in the polymerization of ($X_A$) in Example 1, except that the polymerization catalyst was changed to the Ziegler-Natta catalyst (B), the production speed was changed to 6.9 kg/h, the amount of hydrogen supplied was changed to 0.95 mol %, and the polymerization pressure was changed to 0.3 MPaG, thereby obtaining an ethylene-based polymer ($X_G$). The obtained ethylene-based polymer ($X_G$) had a viscosity average molecular weight of 2,000,000 and a density of 937 kg/m³. Further, the polymerization activity in the first-stage reactor was 19,500 g per gram of the catalyst.

The polymerization slurry in the polymerization reactor was guided to an intermediate flash tank that was set under the same conditions as for ($X_A$) of Example 1, except that the pressure was changed to 0.1 MPaG, and 1-butene was not supplied.

<(10) Polymerization of Ethylene-Based Polymer ($Y_G$)>

Polymerization was carried out in the same manner as in the polymerization of ($Y_A$) in Example 1, except that the production speed was changed to 12.9 kg/h, the amount of hydrogen supplied was changed to 14.4 mol %, the polymerization temperature was changed to 85° C., and the amount of 1-butene supplied was changed to 10.5 mol %, thereby obtaining an ethylene-based polymer ($Y_G$).

The obtained ethylene-based polymer ($Y_G$) had a viscosity average molecular weight of 300,000 and a density of 944 kg/m³. Further, the polymerization activity in the second-stage reactor was 33,000 g per gram of the catalyst.

The polymerization slurry in the polymerization reactor was guided to a final flash tank that was set under the same conditions as for ($Y_A$) of Example 1. Then, the polymerization slurry was separated and dried in the same manner as for ($Y_A$) of Example 1, thereby obtaining a polyethylene powder (G).

Example 7

<(11) Polymerization of Polyethylene Powder (H)>

Polymerization was carried out under the same conditions as in Example 4, except that the polymerization catalyst was changed to the Ziegler-Natta catalyst (B), the production speed was changed to 10.0 kg/h, and the amount of hydrogen added was changed to 0.56 mol %.

The obtained polyethylene powder (H) had a viscosity average molecular weight of 1,500,000, a density of 930 kg/m³, and a median diameter of 82 μm.

Further, the polymerization activity in the reactor was 59,500 g per gram of the catalyst.

The above various evaluations were performed on the polyethylene powder (H), and a microporous membrane of the polyethylene powder (H) produced by the (Method for Producing Microporous Membrane) described above, and the results are shown in Table 1.

Comparative Example 1

64 parts by mass of a polyethylene powder (J) polymerized as shown below was added to 36 parts by mass of a polyethylene powder (I) polymerized as shown below, and the mixture was dry-blended using a tumbler blender, thereby obtaining a polyethylene powder (K).

The polyethylene powder (K) had a viscosity average molecular weight of 280,000, a density of 946 $kg/m^3$, and a median diameter of 76 μm.

The above various evaluations were performed on the polyethylene powder (K), and a microporous membrane of the polyethylene powder (K) produced by the (Method for Producing Microporous Membrane) described above, and the results are shown in Table 1.

<(12) Polymerization of Polyethylene Powder (I)>

Polymerization was carried out under the same conditions as in Example 4, except that the flow rate of normal hexane was changed to 40 L/h, the production speed was changed to 7.1 kg/h, the amount of hydrogen added was changed to 23 mol %, the polymerization temperature was changed to 50° C., the polymerization pressure was changed to 0.37 MPaG, the average residence time was changed to 3.3 hours, the pressure of the final flash tank was changed to 0.05 MPaG, and 1-butene was not supplied to the final flash tank.

The obtained polyethylene powder (I) had a viscosity average molecular weight of 680,000, a density of 943 $kg/m^3$, and a median diameter of 79 μm. Further, the polymerization activity in the reactor was 20,600 g per gram of the catalyst.

<(13) Polymerization of Polyethylene Powder (J)>

Polymerization was carried out under the same conditions as in Example 4, except that the flow rate of normal hexane was changed to 40 L/h, the production speed was changed to 12.8 kg/h, the amount of hydrogen added was changed to 44 mol %, the polymerization pressure was changed to 0.65 MPaG, the average residence time was changed to 3 hours, 5.7 mol % of 1-butene was supplied, the pressure of the final flash tank was changed to 0.05 MPaG, and 1-butene was not supplied to the final flash tank.

The obtained polyethylene powder (J) had a viscosity average molecular weight of 60,000, a density of 947 $kg/m^3$, and a median diameter of 75 μm.

Further, the polymerization activity in the reactor was 57,200 g per gram of the catalyst.

Comparative Example 2

As shown below, an ethylene-based polymer $(X_L)$ was polymerized in the first-stage reactor, and an ethylene-based polymer $(Y_L)$ was polymerized in the second-stage reactor, thereby obtaining a polyethylene powder (L).

The polyethylene powder (L) had a viscosity average molecular weight of 280,000, a density of 942 $kg/m^3$, and a median diameter of 115 μm.

The above various evaluations were performed on the polyethylene powder (L), and a microporous membrane of the polyethylene powder (L) produced by the (Method for Producing Microporous Membrane) described above, and the results are shown in Table 1.

<(14) Polymerization of Ethylene-Based Polymer $(X_L)$>

Polymerization was carried out in the same manner as in the polymerization of $(X_A)$ in Example 1, except that the flow rate of normal hexane was changed to 80 L/h, the amount of hydrogen supplied was changed to 2.8 mol %, the polymerization temperature was changed to 78° C., the polymerization pressure was changed to 0.3 MPaG, the average residence time was changed to 1.7 hours, and 4.8 mol % of 1-butene was supplied, thereby obtaining an ethylene-based polymer $(X_L)$. The obtained ethylene-based polymer $(X_L)$ had a viscosity average molecular weight of 710,000 and a density of 942 $kg/m^3$. Further, the polymerization activity in the first-stage reactor was 20,900 g per gram of the catalyst.

The polymerization slurry in the polymerization reactor was guided to an intermediate flash tank that was set under the same conditions as for $(X_A)$ of Example 1, except that the pressure was changed to 0.1 MPaG.

<(15) Polymerization of Ethylene-Based Polymer $(Y_L)$>

Polymerization was carried out in the same manner as in the polymerization of $(Y_A)$ in Example 1, except that the amount of hydrogen supplied was changed to 29 mol %, the polymerization temperature was changed to 78° C., and the polymerization pressure was changed to 0.65 MPaG, thereby obtaining an ethylene-based polymer $(Y_L)$. The obtained ethylene-based polymer $(Y_L)$ had a viscosity average molecular weight of 45,000 and a density of 942 $kg/m^3$. Further, the polymerization activity in the second-stage reactor was 12,000 g per gram of the catalyst.

The polymerization slurry in the polymerization reactor was guided to a final flash tank that was set under the same conditions as for $(Y_A)$ of Example 1. Then, the polymerization slurry was separated and dried in the same manner as for $(Y_A)$ of Example 1, thereby obtaining a polyethylene powder (L).

Comparative Example 3

<(13) Polymerization of Polyethylene Powder (M)>

Polymerization was carried out under the same conditions as in Example 4, except that the polymerization catalyst was changed to the Ziegler-Natta catalyst (B), the flow rate of normal hexane was changed to 40 L/h, the production speed was changed to 13.1 kg/h, the amount of hydrogen added was changed to 13 mol %, the polymerization temperature was changed to 83° C., the polymerization pressure was changed to 0.37 MPaG, the average residence time was changed to 3 hours, the pressure of the final flash tank was changed to 0.05 MPaG, and 1-butene was not supplied to the final flash tank.

The obtained polyethylene powder (M) had a viscosity average molecular weight of 310,000, a density of 953 $kg/m^3$, and a median diameter of 94 μm.

Further, the polymerization activity in the reactor was 41,900 g per gram of the catalyst. The above various evaluations were performed on the polyethylene powder (M), and a microporous membrane of the polyethylene powder (M) produced by the (Method for Producing Microporous Membrane) described above, and the results are shown in Table 1.

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Polyethylene powder | Viscosity average molecular weight (10,000) | 27 | 29 | 24 | 70 | 50 | 90 | 150 | 28 | 30 | 31 |
| | Slope of straight line connecting two local maximum points (N · m/min) | 5.9 | 6.5 | 2.1 | 5.2 | 3.9 | 12.1 | 10.5 | 0.45 | 0.7 | 1.79 |
| | $E_A/E_B$ | 0.04 | 0.03 | 0.11 | 0.11 | 0.14 | 0.02 | 0.05 | 0.18 | 0.25 | 0.18 |
| | Percentage (%) of $E_0$ in $E_t$ | 0 | 0 | 5.4 | 0 | 0 | 0 | 0 | 3.7 | 0.85 | 0 |
| | Median diameter (μm) | 89 | 96 | 102 | 110 | 105 | 90 | 82 | 76 | 115 | 94 |
| | Density (kg/m³) | 945 | 942 | 944 | 936 | 941 | 941 | 930 | 946 | 944 | 953 |
| Microporous membrane | Uniformity of pore structure | ◎ | ◎ | ○ | ◎ | ○ | ○ | ○ | ○ | X | X |
| | Number of defects | ◎ | ◎ | ○ | ◎ | ○ | ◎ | ◎ | X | X | ○ |
| | Shutdown temperature | ◎ | ◎ | ◎ | ○ | ◎ | ○ | ○ | ○ | ○ | X |

The present application is based on a Japanese patent application (Japanese Patent Application No. 2020-191016) filed with the Japan Patent Office on Nov. 17, 2020, the contents of which are incorporated herein by reference.

INDUSTRIAL APPLICABILITY

The polyethylene powder of the present invention is industrially applicable as a raw material for various molded articles, microporous membranes, and battery separators.

The invention claimed is:

1. A polyethylene powder having a viscosity average molecular weight of 100,000 or more and 1,500,000 or less, wherein a polyethylene molecular chains have an entanglement state as determined by kneading the polyethylene powder under the following <Kneading Conditions>, resulting in a torque curve measured during kneading, a slope of a straight line connecting two local maximum points is 2 N·m/min or more and 15 N·m/min or less:

<Kneading Conditions> after 24 g of liquid paraffin is kneaded for 10 minutes using a Labo Plastomill Mixer, produced by Toyo Seiki Seisaku-sho, Ltd. (unit model: 30C150, mixer model: R-60) at a set temperature of 114° C. and a rotation speed of 5 rpm, 16 g of the polyethylene powder and 0.4 g of an antioxidant are added thereto, followed by kneading at a rotation speed of 30 rpm for 3 minutes, and then the set temperature is raised from 114° C. to 163° C. over 1 minute; and after the temperature rise, the mixture is kneaded at a set temperature of 163° C. and a rotation speed of 30 rpm for 5 minutes.

2. The polyethylene powder according to claim 1, wherein, in the torque curve obtained when kneading the polyethylene powder using the Labo Plastomill under the above <Kneading Conditions>, a ratio of kneading energy ($E_A$) during swelling to kneading energy ($E_B$) during melting, ($E_A/E_B$), is 0.02 or more and 0.3 or less.

3. The polyethylene powder according to claim 1, wherein, in the torque curve obtained when kneading the polyethylene powder using the Labo Plastomill under the above <Kneading Conditions>, kneading energy ($E_0$) at the start of swelling is 5% or less of the total kneading energy ($E_t$).

4. The polyethylene powder according to claim 3, wherein a kneading energy (E0) at a start of swelling is 0.1% or less of a total kneading energy ($E_t$).

5. The polyethylene powder according to claim 1, wherein, in the torque curve obtained when kneading the polyethylene powder using the Labo Plastomill under the above <Kneading Conditions>, the ratio of kneading energy ($E_A$) during swelling to kneading energy ($E_B$) during melting, ($E_A/E_B$), is 0.02 or more and 0.1 or less.

6. The polyethylene powder according to claim 1, which has a median diameter of 50 μm or more and 250 μm or less.

7. The polyethylene powder according to claim 1, which is for use in a battery separator.

8. The polyethylene powder according to claim 1, wherein the range of the slope of a straight line connecting two local maximum points in the torque curve is 5 Nm/min or more and 10 Nm/min or less.

9. The polyethylene powder according to claim 1, wherein the two local maximum points are a local maximum point during a first peak and a local maximum point during a second peak in the torque curve.

10. The polyethylene powder according to claim 1, wherein a density range of the polyethylene powder is 920 kg/m³ or more and 960 kg/m³ or less.

11. The polyethylene powder according to claim 1, which is composed of an ethylene-based polymer.

12. A molded article comprising the polyethylene powder according to claim 1.

13. A microporous membrane comprising the polyethylene powder according to claim 1.

14. The microporous membrane according to claim 13, which is a battery separator.

15. The microporous membrane according to claim 13, wherein a number of defects present in the microporous membrane of 250 mm×250 mm is less than 5.

16. The microporous membrane according to claim 13, wherein a shutdown temperature of the microporous membrane is less than 134° C.

17. A method for producing the microporous membrane according to claim 13, comprising steps of extruding, drawing, extracting, and drying resin using a wet extrusion method.

* * * * *